US005392272A

United States Patent [19]
Parkinson, deceased

[11] Patent Number: 5,392,272
[45] Date of Patent: Feb. 21, 1995

[54] SINGLE ERASABLE OPTICAL RECORDING LAYER HAVING BOTH RETENTION AND EXPANSION CHARACTERISTICS

[75] Inventor: Dean B. Parkinson, deceased, late of Redwood City, Calif., by Elfriede Parkinson, executrix

[73] Assignee: SRI International, Menlo Park, Calif.

[21] Appl. No.: 38,246

[22] Filed: Mar. 29, 1993

[51] Int. Cl.⁶ .................................. G11B 7/24
[52] U.S. Cl. .................... 369/100; 369/275.2; 369/284; 369/288; 430/495; 430/945
[58] Field of Search ............... 369/100, 275.2, 284, 369/288; 430/945, 495, 346, 345, 20.19; 428/64

[56] References Cited

U.S. PATENT DOCUMENTS

| | | | |
|---|---|---|---|
| 4,238,803 | 12/1980 | Terao et al. | 430/945 |
| 4,264,986 | 4/1981 | Willis | 369/275.2 |
| 4,371,954 | 2/1983 | Cornet | 369/288 |
| 4,651,172 | 3/1987 | Watanabe et al. | 430/495 |
| 4,719,615 | 1/1988 | Feyrer et al. | 369/284 |
| 4,825,430 | 4/1989 | Halter et al. | 369/275.2 |
| 4,852,075 | 7/1989 | Feyrer et al. | 369/100 |
| 4,896,314 | 1/1990 | Skiens et al. | 369/284 |
| 4,901,304 | 2/1990 | Lind et al. | 369/284 |
| 4,950,520 | 8/1990 | Imai et al. | 428/64 |
| 4,973,520 | 11/1990 | Takada et al. | 428/412 |
| 4,975,355 | 12/1990 | Suzuki | 430/346 |
| 4,975,358 | 12/1990 | Sonnenschein et al. | 430/495 |
| 4,977,064 | 12/1990 | Sukawa et al. | 430/495 |
| 4,978,578 | 12/1990 | Kanno et al. | 428/412 |
| 4,983,440 | 1/1991 | Ikeda et al. | 428/64 |
| 4,983,505 | 1/1991 | Higuchi et al. | 430/495 |
| 5,118,541 | 6/1992 | Yamamoto et al. | 430/945 |
| 5,153,873 | 10/1992 | Spruit et al. | 369/100 |
| 5,213,955 | 5/1993 | Hamada et al. | 430/945 |

Primary Examiner—Paul M. Dzierzynski
Assistant Examiner—Kim-Kwok Chu
Attorney, Agent, or Firm—Burns, Doane, Swecker & Mathis

[57] ABSTRACT

The invention relates to a novel information recording medium and the recording of information thereon. The recording medium material possesses both retention and expansion characteristics suitable for use with optical recording, reading and erasing systems.

19 Claims, No Drawings

SINGLE ERASABLE OPTICAL RECORDING LAYER HAVING BOTH RETENTION AND EXPANSION CHARACTERISTICS

BACKGROUND OF THE INVENTION

The invention relates to a novel information recording medium and the recording of information thereon. More particularly, the invention relates to an optical recording medium, preferably in the form of a disk, or in tape format, suitable for use with an optical recording and playback apparatus, which recording medium is stable yet readily and accurately erasable.

It has long been apparent that optical recording, and in particular, optical disk recording, is a very promising recording method as it allows instantaneous playback, very fast random access and much higher recording density than is possible with magnetic recording and archival storage. It is widely recognized that the optical disc system with the greatest potential is the type that uses a highly focused laser beam as an ultra-fine recording stylus to store encoded information at very high data rates with extremely high density.

Optical recording methods have been proposed in which light from a laser is focused upon the surface of a recording medium with sufficient intensity to cause a detectable change in the physical characteristics of the surface material. Among these methods is the establishment of an information pattern of pits or bumps. In such methods, the representative information pattern of pits can be formed in the surface of the recording medium by suitably controlling the intensity of the focused light in accordance with the information to be recorded while relative motion is established between the recording medium and the focused light spot.

The recording process must have a sufficiently high resolution to allow the recording of bumps or pits of very small size to satisfy the requirement of high density, and the sensitivity of the process must be high enough to permit the use of economical, low power recording lasers. But the sensitivity should be low enough so that the recording medium can withstand a playback exposure high enough to yield a high signal-to-noise ratio. Furthermore, it is clear that in order to avoid long term degradation due to ambient conditions and to ensure totally non-destructive readout, the process must have a well defined exposure threshold below which there is no response. In addition, it is desirable that the recording process permit instant playback without the need for post-recording processing before readout. None of the presently known processes meet all these requirements.

In the past, there have been increasing efforts to develop an information recording method in which information is written in a thin film of metal or the like formed on a substrate by using a laser ray or beam. According to such a method, information recording has been accomplished by forming holes or recesses in metallic thin films under the action of a thermal energy beam such as a laser ray. See U.S. Pat. No. 4,238,803.

The sensitivity of the films for laser film deformation recording can be enhanced by the addition of pigments or dyes which exhibit a high absorption at the laser emission wavelength. Erasure of the film deformation is accomplished by recording over the information to be erased using a similar laser beam but with a much smaller scan line spacing, preferably to provide overlap of the scan lines.

U.S. Pat. No. 4,977,064 describes an optical recording medium of two recording media layers with each layer containing different light-sensitive dyes. The two layers have individual specific reflectance, transmittance and absorbance which allows for detection of a variation in the amount of light reflected from the boundary between the two layers.

In another recording system, the recording medium comprises two layers of first and second materials. The first layer of material is a relatively inextensible metal or polymer having a low thermal conductivity and a high coefficient of thermal expansion. The second layer of material possesses a glass transition temperature considerably above that of the bottom layer material and has low thermal conductivity. U.S. Pat. No. 4,371,954 discloses a dual layer medium with both layers being composed of metal. U.S. Pat. No. 4,719,615 describes the use of elastomers for the first layer and thermoplastic resins for the second layer. Other multiple layer film media imparting different optical and thermal mechanical properties are described in U.S. Pat. Nos. 4,901,304 and 4,825,430.

Characteristic of these multiple film media is the use of a retention layer and an expansion layer, which cooperate to form erasable, non-vesicular bumps projecting into a compression layer. The retention layer is necessary to maintain the bump, because of the instability of the expansion layer; the expansion layer will contract upon cooling. Upon exposure of the material with a focused laser beam, the beam is transmitted through the retention layer to the underlying expansion layer where most of the energy is absorbed in the expansion layer material, locally heating the expansion layer and causing it to expand to form a bump. This exposure also heats the retention layer to above its glass transition temperature causing it to melt. The swelling of the expansion layer deforms the melted retention layer, pushing it into the form of the bump, as well. After bump formation, the retention layer will cool below its glass transition temperature, thus fixing the shape of the bump as data stored in the medium. Over time, the underlying expansion layer will contract to substantially its original shape.

To erase, both layers are again heated to melt the retention layer and expand the expansion layer. The expansion layer is then cooled while the heated retention layer conforms to its shape. Ultimately, a cooled, flat expansion layer is obtained with a corresponding flat retention layer. The retention layer is then cooled to fix the shape.

In another type of optical recording system, a laser beam is focused on an erasable data storage medium to heat the medium and thereby induce a stable transition from one morphological state to another morphological state, such as the amorphous to the crystalline phase. The two physical states have different optical properties, i.e. the optical transmittance and optical reflectance properties of the respective states. Consequently, to read a data bit, light from a laser beam, which is at a lower power level than is used for writing, is focused on the data storage medium and will be reflected by the medium depending on the physical state of the medium. See U.S. Pat. No. 4,264,986.

However, the above materials change only slightly from one state to another and are not substantially distinguishable using optical means. For example, the optical data storage medium, disclosed in U.S. Pat. No. 4,975,355 includes semiconductor or chalcogenide materials. These materials yield very low signal-to-noise ratios due to insignificant changes in the recording medium. Furthermore, the stability of these materials is insufficient in that over time they will transform naturally from their amorphous state to their crystalline phase. Additionally, the data storage medium will physical fatigue after a relatively few number of erase/write cycles because of the delicate nature of the material utilized for the physical state transformation. This physical fatigue factor will not be competitive with magnetic storage technology, which can achieve a high number of erase/write cycles. Also, with other materials such as metals and elastomers, this type of medium is highly susceptible to hard bit errors resulting from imperfections in the medium. More particularly, any anomalies or irregularities in the surface of the medium will affect the ability of the top layer to accommodate changes between the two physical states of the bottom layer.

SUMMARY OF THE INVENTION

Accordingly, it is one object of the invention to provide a novel erasable data storage medium which provides its recording mark or bump by transforming from one morphological state to another upon heating.

It is another object of the invention to provide such an erasable data storage medium which can exhibit an increased and significant degree of change from one morphological state to another thereby providing an improved signal-to-noise ratio, to avoid unwanted, reverse transformation from one morphological state to the other and provide an increased durability which will increase the number of effective erase/write cycles.

It is also an object of the invention to obtain a stable and durable medium without the use of complex two-layer expansion/retention structures.

Some if not all of the above objects can be obtained by an information recording structure comprising an erasable and stable recording medium layer comprising a particular material which will change morphological states upon heating. This particular material is provided for in a single layer recording medium and possesses both retention and expansion properties.

The present invention can provide a high signal-to-noise ratio on playback of the recorded information because the morphological nature of the material yields smooth reproducible surfaces with well defined bump patterns. During the playback or read mode, good reflectance of the spot of radiation can be obtained from the unmarked, flat or smooth areas of the recording medium. When the spot of radiation strikes a pronounced bump, the radiation is scattered because of the curvature of the bump. Therefore, a signal in the form of a strongly marked drop in the intensity of reflected radiation, as measured with an optical sensor, can be detected.

Additional advantages of the present invention relate to the material's structural simplicity, and its durability and stability when the material is utilized as the recording medium. Once bumps are formed by transition from the crystalline phase to the amorphous phase, natural reversal will be slowed significantly if not altogether. Physical fatigue is also minimized allowing for the number of erase/write cycles to be increased. Furthermore, the morphological nature of the material yields very smooth reproducible surfaces with well defined bump patterns.

DETAILED DESCRIPTION OF THE PREFERRED EMBODIMENTS

In a preferred embodiment, there is provided an information recording structure comprising a single erasable recording medium layer. The layer is a material having both retention and expansion characteristics and is transferrable from a crystalline phase to an amorphous phase to form a bump, but stable against unprovoked re-transformation without the use of a bump fixing retention layer.

According to the invention, a radiation beam is used to inject a pulse of heat energy into a smooth surface recording medium to produce a recording mark or bump on the surface of the recording medium.

The information recording structure of the present invention is constructed by forming a smooth and uniform layer of homogeneous recording medium and subsequently exposing the medium to focused radiation so as to create a zone within the medium having different optical and thermal-mechanical properties. More particularly, the zones are bumps formed in a pattern for information storage purposes and can be erased by further application of heat or radiation. The bumps are created by a volumetric change between first and second stable solid states, i.e., from a crystalline state to an amorphous state.

Although in the most advantageous applications of the present invention a laser stylus is employed to melt the sharply defined region of the recording medium, there are alternative, although less convenient, devices for rapidly and transiently heating a localized region of a meltable medium, e.g. electron or non-laser electromagnetic radiation beams are all within the scope of this invention.

As noted above, the present invention involves recording information by a change in volume from a first to a second stable solid state in the recording medium. Selective regions of the medium are transformed to either of these states by melting the medium and cooling it from the molten state. A focused beam of radiation, employed for this purpose, produces pits or bumps in a predetermined pattern as a means of recording desired information.

At the outset, the information recording medium should have an optically smooth and homogeneous surface. More particularly, the surface should not exhibit any irregularities in surface contour, or any particulates or other inclusions, such as grains of impurities or pigments distributed within the material itself which would interfere with distinguishing optically between the smooth unrecorded surface of the medium and the raised bumps or depressed pits previously recorded in the medium.

During recording, the surface of the recording medium layer is pulsed with a very narrow focused beam of radiation to inject a quantity of radiation of sufficient intensity to heat to the melting temperature a small region of material within the medium. Typically, the diameter of the spot or region of the surface that is melted will be less than about 0.65 micron and the duration of the pulse of radiation will be on the order of 100 nanoseconds. Owing to the minuteness of the irradiated region, and because of the sharply defined characteristics of the radiation beam, the amount of heat that is injected into the melted region, and the temperature that it attains, can be closely controlled. The rate of cooling from the molten state can be controlled so that it is possible to selectively produce, on solidification of the melted region, either the first or the second of the different specific volume states in the recording medium.

Simply, to form a bump with a material according to the invention, the spot or region of the material is heated to transform that region of the material from the crystalline to the amorphous phase causing an increase in volume and a corresponding bump. The material is then quickly cooled, fixing the bump.

Furthermore, the materials that are capable of undergoing the thermally induced transition according to the present invention should, once a pattern of bumps have been recorded in the medium, be erasable. The bumps are exposed to radiation of intensity sufficient to remelt the medium. Then, it is allowed to cool slowly allowing for a smooth transition to the crystalline phase such that there is no longer pronounced discontinuities between the former bump patterns and the surrounding mass of the recording medium.

Where the medium is converted from a state of lower specific volume to a state of higher specific volume in the course of recording, the melted reigon is confined on the sides and at the bottom by the unmelted portion of the recording medium. The increase in volume results in a quantity of the melted material being extruded upwardly through the opening that is melted at the surface of the recording medium, so as to form a raised curved bump after cooling of the material.

The height of the recorded bump should be as large and sharply defined as possible to permit the bump to be readily distinguishable from the background flat surface using optical means. Several factors affect the size of the bump obtained in the recording process. The higher the angle of convergence of the radiation beam employed in the recording process is, the higher the bump will be. This factor, however, is not dependent upon the recording medium's physical characteristics. Secondly, the height of the bump is directly related to the increase in the change in specific volume that occurs on transition between the original and the changed states of the recording medium. Thirdly, the size of the bump increases with an increase in the volume of the melted medium, and this is in turn is dependent on the depth of the region which is melted by the radiation beam. The depth to which the medium can be melted is dictated by the transparency of transmissivity of the medium with respect to the particular radiation that is employed. The latter factors affecting the bump height are directly related to the physical characteristics of the recording material. Preferably, the bump height of the recording medium should exceed 10 nm and more preferably 100 nm.

The present invention also encompasses recording media that are capable of undergoing a decrease in specific volume on transformation of one stable solid state to another. In such a case, there is injected the required amount of energy into the region such that, on termination of the radiation pulse, the melted region cools and there is produced a corresponding decrease in volume of the melted zone yielding a depressed pit or hole. As with the raised bumps described above, the depressed areas can be remelted and cooled in a manner sufficient to solidify the melted region back to its original state enabling erasure of the pits while restoring the medium to its original smooth condition.

In selecting materials to be used as recording media according to the present invention, the various factors before-mentioned and additionally the stability and durability of the media must be considered. The medium must be able to retain the shape of the bump during the read-mode. In this mode, a low intensity radiation beam is scanned across the pattern of bumps on the medium to retrieve data stored therein. Stability is also at least partially defined in terms of maintaining a stable morphological state which yields distinct bumps during read-modes. If the medium possesses a very low softening point temperature, the bumps will be erased or partially erased during reading. Moreover, the medium must be durable and therefore capable of being erased numerous times without physically affecting its surface, e.g., changing the height of the bumps. The medium should also be otherwise durable with respect to resisting oxidation, moisture, cracking and chipping.

In a preferred embodiment, the recording medium of the present invention comprises a wax material contained in an organic binder. The binder is preferably uniformly dispersed throughout the wax by pre-mixing prior to formation of the recording medium layer, and will comprise from about 1% to 50% by weight of the recording medium layer, preferably from about 1% to 20%.

While the above combination of a wax and binder is preferred, as would be appreciated by one skilled in the art, however, a variety of compositions may be used. That is, any single material or combination of materials may be used so long as it exhibits the necessary properties of the invention (e.g. retention, expansion, stability) such that a single layer may be used.

Advantageously, the binder enhances the morphological transformation between stable solid states by maintaining a reproducible size of the crystals after every record/erase cycle. Moreover, the binder increases the bump surface uniformity and retains the bump shape during read modes. The binders of the present invention are preferably acetate polymers. The most preferable is a poly(ethylene-vinyl acetate).

The preferred recording medium that displays the necessary characteristics of the invention will also include a type A, residual, microcrystalline wax contained in a poly(ethylene-vinyl acetate) binder. Other suitable materials for use in the invention include poly(1-butenes) and poly (butyl-vinyl ethers).

The physical properties of the materials used in the invention are uniquely suited for use as recording media. They display softening points that insure the recording media will remain dimensionally stable for normal variations in ambient temperature, and hence provide a permanent record upon storage. The preferred softening point temperatures will range from about 60° to 150° C., and more preferably from about 60° to 135° C.

Additionally, it has been observed from the specific volume change from one stable solid state to another, e.g., from amorphous to crystalline states, that there is a presence of a fine microcrystalline grain structure, with the grain sizes being small in comparison to the wavelength of light. Therefore they will not interfere with the optical morphology of the surface. The transmissivity of the media allows the radiation to reach a depth sufficient to melt a significant region of the media, thereby creating bumps of optically distinguishable size.

The present invention, particularly that aspect involving the combination of two materials (the wax and binder), also eliminates the need for retention layers above the recording medium layer. In the embodiment where the binder retains the shape of the bump formed during recording, this also aids in increasing the signal-to-noise ratio.

In the prior art, the retention layer maintains the shape of the bump even when the expansion layer cannot, but the bumps are not as distinct as in the present invention due to the indirect formation of the bump in the retention layer by the expansion layer. Unlike the prior art, in the aspect of the invention utilizing two different materials in the recording medium, each material will have different coefficients of thermal expansion. Therefore, when the bump is being cooled this difference in thermal expansion allows the materials to crystallize at different rates. In so doing, the bump formed is very distinct and retains its shape during the read modes. Accordingly, a much higher signal-to-noise ratio is obtained.

Advantageously, the media also allow numerous erase/write cycles without degradation or morphological change of the material. This maintains the homogeneity of the media and reduces the time required for total erasure. Preferably, the media is capable of undergoing at least about 5,000 erase/write cycles, more preferably 10,000, and most preferably at least about 100,000 erase/write cycles.

There are other desirable properties of the preferred recording media according to the invention. In particular, the thermal, morphological and optical properties are of importance in obtaining proper bump size and a high signal/noise ratio.

The thermal conductivity should be sufficiently low for numerous reasons: it prevents the lateral spread of thermal energy during the bump forming process, allowing high resolution recording; it reduces the power threshold levels for writing and erasing; and it allows operation of the system under adverse climatic conditions. Desirably, the thermal conductivity is less than about 6 mW/cm° K., more preferably 3 mW/cm° K.

The characteristic heating time should be sufficiently short to enable a volume of the media, less than a cubic micron in size, to approach its maximum density within a few microseconds. Further, to achieve good sensitivity, the recording process should call for as little heat as possible from the radiation source. In the case of a crystalline material, it is necessary to heat the substance beyond the glass transition temperature of the amorphous phase to the true thermodynamic melting temperature to enable complete amorphization on cooling. This removes the last traces of crystallinity that remain even after reaching the glass transition temperature. Consequently, the melting temperature should not be excessively high. However, for crystallization purposes the glass transition temperature and the melting temperature should be separated by several tens of degrees. The two major factors governing how much heat is required to achieve melting are the specific heat capacity and the latent heat of fusion. Accordingly, it is preferable to select materials in which these two values are low. Moreover, the material should also have a sharply defined melting temperature in the crystalline state and a relatively well defined softening temperature in the amorphous state.

The optical attenuation length of the material for the chosen radiation wavelength should be long enough to permit a depth of penetration sufficient to produce the net volume expansion required to yield an easily detectable bump. To produce a playback or read signal with the greatest intensity using a playback beam focused to a diffraction-limited spot, the height and width of the bump should be comparable with the wavelength of the playback beam. Preferably the attenuation length is about one-half to twice the width of the spot melted at the surface of the medium.

Additionally, the preferred materials should facilitate the fabrication of large area recording media of optical uniformity and homogeneity without resorting to expensive coating processes. The materials should be soluble in a wide range of solvents, allowing for numerous, more simplistic, coating processes such as spin coating. High solvent solubility also increases the adherence of the deposited material to the substrate.

The recording structure of the present invention may be a single film self-supporting, in which case any suitable or conventional coating technique may be used. However, the recording material is preferably deposited as a film on a suitable substrate to add dimensional stability thereto. The substrate may be optically featureless or may contain preformed information in the form of pits or grooves. The substrate is made of a thermally stable material, which is also mechanically rigid and dimensionally stable and which ideally has an isotopically low coefficient of thermal expansion. Therefore, the recording medium does not warp during storage, writing, erasure or reading. Examples of suitable materials for the substrate include ceramics, glass, plastics such as polycarbonate, polymethylmethacrylate and polyacrylates, resins such as phenolic resins, epoxy resins, polyesters, polyimides, polyether sulfones, polyether ketones, polyolefins, polyphenylene sulfide and nylon, as well as metals such as aluminum. Furthermore, the shape and size of the substrate can vary depending upon the application. The shape and format, for example, may be a disk, tape, belt or drum. A disk shape is most preferred.

In order for the recording medium to absorb light at a predetermined wavelength, it may be necessary to add to the material a dye of appropriate absorption wavelength. Generally, a dye exhibiting strong absorbance of light in the wavelength range of 400–900 nm is preferred. For example, if an argon laser is employed for writing information into the recording medium, an organic dye such as fluorescein, which is highly absorptive at the light frequency of the laser, can be advantageously used. Other dyes which may be used are polymethine dyes, merocyanine dyes, ozanmulene dyes, anthraquinare dyes, naphtalendione dyes, dithiol metal complex dyes, diamino metal complex dyes, xanthene dyes or triphenyl methane dyes. It is preferred to employ dyes of suitable properties so as not to detrimentally affect the recordability and erasability of the recording medium. The addition of a dye may change the physical properties, such as the thermal conductivity or melting point of the medium, and care must be taken when selecting an appropriate recording material/die combination. Other additives, such as stabilizers, plasticizers, surfactants, antistatic agents, flame retardants, dispersants, smoothening agents, leveling agents, anti-bleeding agents, antioxidants, water repellents and emulsifiers might also be desirably added to the material and their effect, if any, on the properties of the medium must also be considered.

Since the read, write and erase steps all require operating within a very narrow depth of focus, the film must be applied in a manner which yields extremely flat surfaces to avoid errors and noise. In order to facilitate the coating process, it is advantageous that the dye and recording material be soluble in a wide range of organic solvents, such as alcohols, ketones, ethers or aromatic or chlorinated solvents. This allows the recording material, the dye and other additives to be mutually soluble which, in turn, yields flat recording medium surfaces. Upon evaporation of the solvent, the dye or other additives should not precipitate in a particulate form because this causes light scattering.

Any suitable coating technique may be utilized to form flat recording film surfaces such as chemical vapor deposition, vacuum deposition or plasma deposition. However, spin coating is the most preferred method, and allows for a high degree of control of film thickness and flatness. Preferred thicknesses of the recording film are determined by the recording sensitivity of the recording medium. The thickness of the film according to the present invention is within the range of 40–400 nm.

The structure of the recording medium may vary in that the recording film may be coated on one or both sides of the substrate. Alternatively, two substrates having the recording film on either side can be combined allowing the sides having the recording films to face each other at a constant distance, the combined substrates being sealed to prevent dust contamination and scratches. The recording structure of this invention may also have a sub-layer such as metal reflective layer or a layer of various resins on the substrate, with the recording film being coated over it. Additionally, various thermoplastic resins, thermosetting resins, ultra violet or electron beam cured resins may be utilized as sub-layers. A suitable protective layer or encapsulant can also be used, if desired, to protect the recording layer from dirt, dust, scratches or abrasion. Inorganic protective layers are formed of dielectrics such as oxides, nitrides and sulfides. Additionally organic protective layers are made of hot melt resins, ultra-violet ray curable resins or electron beam curable resins.

For illustrative purposes, the optical recording device of the present invention may be operated using a light beam, such as a laser, to write, read and erase desired information. The substrate or disk is rotated at a constant angular velocity while a laser is focused on the recording structure surface. The intensity of the light beam is controlled in accordance with the desired information to be recorded. Control of the light intensity is effectuated by picture-representative video signals that vary the light intensity between a high level sufficient to effect melting of the medium and low level insufficient to effect such melting. Preferred writing speeds range from $10^{10}$ to $10^{20}$ bits per second.

The relative diameter and depth of the melted region will depend not only on the optical and thermal properties of the recording layer but also on the characteristics of the writing beam such as the focused spot diameter, depth of focus, intensity profile and intensity and duration of the writing pulse. The recording material of the present invention requires a very low intensity light beam within the range of I to 10 mW and preferably 2 to 5 mW. This reduces the levelling or erasure of previously recorded information of adjacent bumps during the writing process. It is preferred that the melting of the recording film does not proceed to the substrate layer. If melting is to proceed to the substrate, the substrate material employed is preferably glass, ceramic, or a metallized substrate.

The melting of the recording material in designated areas of the medium forms an information track comprising a succession of spaced bumps in the recording surface of the disk. Variations in the length and separation of the bumps are representative of the recorded information. The information track may be in either digital or analog form.

The recorded information is retrieved by an optical playback process in which a light beam is focused upon the information track of a rotating recording medium. Pursuant to the principles of the present invention, the playback beam has a constant intensity at a level insufficient to effect melting of the recording layer or erasure of the recorded information. A photodetector, positioned to receive light reflected from the successive regions of the information track as they pass through the path of the focused light, develops a signal representative of the recorded information.

Several variations in the playback or reading system are possible with the recording medium of the present invention. The most preferred mode of reading information involves the relative reflection between the recording material surface and those areas in which bumps have been formed in the recordation of information. When the reflectivity of the recording material surface is of relatively high reflectivity, the reflectivity in the areas of the bumps will be less than in the regions without bumps when a beam from the read laser passes thereby. When the relative reflectivity of the recording material surface is low as compared to that of the substrate, however, the reflectivity in the areas of the bumps will be more than in the regions without bumps when a beam from the read laser is focused thereon. Consequently, a written bit can be registered as an increase in reflected intensity.

The particular physical properties exhibited by the recording medium of the present invention enable complete and accurate erasure of recorded information. Erasure of the recorded information is readily carried out by heating the medium to a temperature sufficient to fluidize the recording film such that the entire medium is levelled by transformation to a single solid state. The erasure temperature ranges between about 90° to 200° C. This may be done globally by heating the entire structure in an oven or some other suitable means, or by means of a laser beam whose intensity is intermediate between that of the write beam and read beam.

Although the invention has been described with preferred embodiments, it is to be understood that variations and modifications may be resorted to as will be apparent to those skilled in the art. Such variations and modifications are to be considered within the purview and the scope of the claims appended hereto.

What is claimed:

1. An information recording medium comprising a layer of single erasable recording material that has both retention and expansion characteristics and that is transformable from a crystalline phase to an amorphous phase wherein said material comprises at least two components, each having a different coefficient of thermal expansion, said material effective for forming a bump on its surface of improved distinctness over a double layer bump or a single layer bump of a material containing one component.

2. An information recording medium comprising a layer of single erasable recording material that has both retention and expansion characteristics and that is transformable from a crystalline phase to an amorphous phase wherein the material is a combination of a wax and a binder, said combination providing increased retention and expansion characteristics.

3. An information recording medium according to claim 2, wherein the material, upon transformation from the crystalline phase to the amorphous phase, forms a bump on its surface and wherein the height of the bump formed, for identical widths, ranges from about 10 to 100 nm.

4. An information recording medium according to claim 2, wherein the material comprises a type A, residual, microcrystalline wax.

5. An information recording medium according to claim 2, wherein the material comprises a poly(ethylene-vinyl acetate) binder.

6. An information recording medium according to claim 2, wherein the binder is uniformly dispersed throughout the wax and comprises from about 1% to 50% by weight of the layer of the single erasable recording material.

7. An information recording medium according to claim 2, wherein the binder is uniformly dispersed throughout the wax to maintain homogeneous and reproducible morphological states.

8. An information recording medium according to claim 7, wherein the recording medium maintains a high degree of durability of from about 10,000 to 100,000 record/erase cycles.

9. An information recording medium according to claim 2, wherein the material, upon transformation from the crystalline phase to the amorphous phase, forms a bump on the surface of the material and wherein the binder provides an amount of retention effective to maintain the shape and size of the bump during read modes.

10. An information recording medium, effective to provide from about 10,000 to 100,000 record/erase cycles, that includes a layer of single erasable recording material comprising a combination of a wax and binder, said combination having both retention and expansion characteristics, wherein said wax is a type A, residual, microcrystalline wax and said binder is a poly(ethylenevinyl acetate) binder which is uniformly dispersed throughout the wax to maintain homogeneous and reproducible morphological states, and wherein said material is transformable from a crystalline phase to an amorphous phase to form a bump, but stable against unprovoked re-transformation, without the use of a bump fixing retention layer.

11. A method of recording information comprising the steps of:
providing an erasable recording medium comprising a single layer of a material that has both retention and expansion characteristics and that is transformable from a crystalline phase to an amorphous phase, wherein the material is a combination of a wax and a binder, said combination providing increased retention and expansion characteristics;
applying heat to a localized region at a surface of said layer sufficient to melt said region and transform it to a liquid amorphous phase; and
cooling said layer at a rate effective to fix the region in an amorphous phase whereby bumps are formed on said surface.

12. The method of recording information according to claim 11 wherein the step of providing an erasable recording medium comprises of employing a recording medium comprising a single erasable recording layer of a material that has at least two components, each having a different coefficient of thermal expansion, said material effective for forming a bump on its surface of improved distinctness over a double layer bump or a single layer bump of a material containing one component.

13. The method of recording information according to claim 11 wherein the step of providing an erasable recording medium comprises of employing a recording medium wherein the material comprises a type A, residual, microcrystalline wax.

14. The method of recording information according to claim 11, wherein the step of providing an erasable recording medium comprises of employing a recording medium wherein the material comprises a poly(ethylene-vinyl acetate) binder.

15. The method of recording information according to claim 11, wherein the step of providing an erasable recording medium comprises of employing a recording medium wherein the binder is uniformly dispersed throughout the wax and comprises from about 1% to 50% by weight of the material.

16. The method of recording information according to claim 11 wherein the step of providing an erasable recording medium comprises of employing a recording medium wherein the binder is uniformly dispersed throughout the wax to maintain homogeneous and reproducible morphological states.

17. The method of recording information according to claim 11 wherein the step of providing an erasable recording medium comprises of employing a recording medium that can provide a high degree of durability of from about 10,000 to 100,000 record/erase cycles.

18. The method of recording information according to claim 11 wherein the step of providing an erasable recording medium comprises of employing a recording medium wherein the binder provides an amount of retention effective to maintain the shape and size of the bumps during read modes.

19. The method of recording information according to claim 11 wherein the step of cooling said layer comprises of forming bumps, on the surface of said layer, wherein the height of the bumps formed, for identical widths, ranges from about 10 to 100 nm.

* * * * *